United States Patent [19]

Hamacher

[11] Patent Number: 5,473,877
[45] Date of Patent: Dec. 12, 1995

[54] REINFORCEMENT CORDS FOR ELASTOMERIC PRODUCTS

[75] Inventor: Wilhelm Hamacher, Bruchkoebel-Niederissigheim, Germany

[73] Assignee: SP Reifenwerke GmbH, Hanau, Germany

[21] Appl. No.: 402,398

[22] Filed: Mar. 10, 1995

Related U.S. Application Data

[63] Continuation of Ser. No. 47,184, Apr. 16, 1993, abandoned.

[30] Foreign Application Priority Data

Apr. 16, 1992 [DE] Germany .................. 42 12 846.3

[51] Int. Cl.⁶ .................................................. D02G 3/48
[52] U.S. Cl. .................................... 57/212; 57/902
[58] Field of Search .......................... 57/212, 210, 902, 57/223; 152/451

[56] References Cited

U.S. PATENT DOCUMENTS

| 190,391 | 5/1877 | Van Loon ................ 57/212 X |
|---|---|---|
| 4,349,063 | 9/1982 | Kikuchi et al. ........... 57/212 X |
| 4,679,387 | 7/1987 | Weidenhaupt et al. ...... 57/212 |
| 4,709,544 | 12/1987 | Charvet ................. 57/212 X |
| 4,718,224 | 1/1988 | Obata ................... 57/212 |
| 4,878,343 | 11/1989 | Weidenhaupt et al. ...... 57/212 X |
| 5,198,307 | 3/1993 | Bourgois et al. ......... 52/212 X |

FOREIGN PATENT DOCUMENTS 1061571  4/1954  France ................. 57/212

*Primary Examiner*—Joseph J. Hail, III
*Attorney, Agent, or Firm*—Birch, Stewart, Kolasch & Birch

[57] ABSTRACT

Reinforcement cord for elastomeric products, in particular reinforcement cords, for use in vehicle tires comprising inner filaments (1) and at least one outer filament (2) wound helically around the inner filaments (1), characterised in that at least the outer filament (2) has a flattened cross-section and is so dimensioned and positioned that it substantially co-determines the mechanical characteristics of the reinforcement cord via line-like and/or area contact locations with the inner filaments (1).

23 Claims, 1 Drawing Sheet

REINFORCEMENT CORDS FOR ELASTOMERIC PRODUCTS

This application is a continuation, of application Ser. No. 08/047,184 filed on Apr. 16, 1993, now abandoned.

The invention relates to a reinforcement cord for elastomeric products, in particular to a reinforcement cord for use in vehicle tires of the type comprising inner filaments and at least one outer filament, helically wound around the outer filament.

Tire reinforcement cords of this kind must enter into a good bond with the elastomeric material in which they are embedded and must in addition also be constructed so that their mechanical characteristics remain as unchanged as possible in long-term use. Furthermore, they should have the lowest possible thickness and thus have an associated low weight since this is advantageous for the running characteristics of vehicle tires reinforced therewith. The mechanical characteristics, such as for example the bending and compressive stiffness and the tensile strength of the cord ply manufactured from the reinforcement cords, should be as uniform as possible and generally also as high as possible.

A steel cord, the cores of which consist of two mutually parallel steel filaments, is known from German utility model G 88 10 534. Here the cord core has wound around it a group of steel filaments and the cord core and also this group is additionally surrounded by an outer coil, the lay length of which is less than the lay length of the group of steel filaments. However, the number of steel filaments required to produce this reinforcement cord leads to a relatively large thickness of the reinforcement cord.

The object of this invention is to so form a reinforcement cord for elastomeric products in which the cord thickness and the resultant fabric layer thickness is reduced and additionally so that the mechanical characteristics of the cord ply are improved.

SUMMARY OF THE INVENTION

Accordingly, the present invention provides a reinforcement cord for elastomeric products, in particular for use in vehicle tires comprising inner filaments and at least one outer filament wound helically around the inner filaments characterised in that the at least one outer filament (2) has a flattened cross-section and is so dimensioned and positioned that it substantially co-determines the mechanical characteristics of the reinforcement cord via line-like and/or area contact locations with the inner filaments.

The underlying object is satisfied in advantageous manner through the use and arrangement in accordance with the invention of an outer filament with a special cross-sectional geometry.

An expedient embodiment of the invention comprises a reinforcement cord in which the size of the cross sectional area of the outer filament amounts to substantially between 50 and 100% of the size of the cross sectional area of the inner filaments. In this way, the outer filament, in addition to its function as a surrounding and holding filament for the inner filaments, is additionally formed as a force bearing functional filament. Compressive tensile and bending forces are borne to the same extent by the inner filaments and by the outer filament.

In accordance with a further preferred embodiment, the cross sectional area of the outer filament is in particular of a flat oval shape. The two flattened sides of the outer filament are preferably formed as planar surfaces which extend parallel to one another.

In accordance with a further advantageous embodiment, the reinforcement cord includes one or two inner filaments which have essentially a circular cross-section. Inner filaments can however also be used which have a cross-section differing from a circular shape in order in this way to adapt the mechanical characteristics of the reinforcement cord, such as for example compressive and bending stiffness, to the respective requirements. In further preferred embodiments, the inner filaments extend essentially parallel to one another or are twisted to one another, with the length of lay of the inner filaments being larger than the length of lay of the outer filament.

The direction of winding of the outer filament can be the same or opposite to the direction of twist of the inner filaments, depending on which mechanical characteristics the reinforcement cord is to have. Through a winding in the opposite direction the compressive stiffness is, for example, increased while the flexibility is reduced.

In accordance with a further advantageous embodiment, the inner filaments have wound around them two outer non-crossing filaments in a helical manner. If the two outer filaments have the same lay length as the outer filament in a version with only one outer filament, then the compressive stiffness is, for example, thereby increased since, for the same lay length, twice the number of contact positions are present between the outer and the inner filaments.

In all embodiments the inner and outer filaments can be manufactured of metal, in particular of steel, or also of plastic, in particular of aramid, Kevlar, nylon or the like, depending on which mechanical characteristics the reinforcement cord is to have. Hybrid forms in which metal and plastic are used as a mixture are also possible, in particular in order to obtain heterogeneous characteristics of the reinforcement cord in this manner.

Further particularly advantageous features of the invention are set forth in the subordinate claims. The advantage of the reinforcement cord, formed in accordance with the invention, lies on the one hand in fact that through the use of a flat filament for the winding of the core of the cord a reduction of the thickness of the cord and thus the thickness of the reinforcement ply for the tire is obtained. On the other hand, the mechanical characteristics of the reinforcement ply formed from the reinforcement cord can be improved.

Since filaments with a flattened cross-section have a better compressive modulus than filaments of the same area with a circular cross-section, the compression modulus of cord plies is likewise increased when the reinforcement cord of the invention is used to manufacture them.

For reinforcement cords which are manufactured from filaments with essentially circular cross-section, the winding filament and the filaments which form the core of the cord are connected together via point-to-point connections. Through the high pressure which acts on the filaments via these point-like connections "fretting" wear of the individual filaments takes place as a result of the friction which exists between the filaments. This wear is the larger the higher the pressure between the filaments. Through the use of a flattened filament wound around the inner filaments, the contacts are increased from point-to-point contacts connections to linear to area contact locations. Through this enlargement of the pressure surfaces, a lower fretting potential is generated.

At the same time, the frictional surfaces between the inner and outer filaments are increased so that the compressive stiffness and bending, as also the tensile strength if the reinforcement cord, can be decisively increased through these larger support surfaces. In this way, a considerable improvement in bending can for example, be achieved and thus "flat spot" effect in tires can be counteracted.

A tire cord consists of a multiplicity of reinforcement cords extending parallel to one another and which are set or embedded in rubber.

As a rule, with the inner filaments lying parallel to one another, the position of these inner filaments of a reinforcement cord relative to its axis is randomly distributed, that is, there exist both reinforcement cords in which the surface defined by the inner filaments lies parallel to the cord ply and also reinforcement cords in which this surface is arranged parallel to the cord ply. If one respectively considers the positions of the reinforcement cord at which the outer filament, which is wound around the inner filaments, likewise comes to lie in the defined surface then in these positions the configuration of three filaments lying alongside one another arises. Depending on the relative position of this surface defined by three filaments in relation to the cord ply there results a higher or lower bending stiffness for the cord ply.

In use of a reinforcement cord formed in accordance with the invention, the bending stiffness is in the first case reduced and in the second case increased so that on the whole the mechanical characteristics of the cord ply built up from the reinforcement cords are made more uniform.

BRIEF DESCRIPTION OF THE DRAWINGS

The invention will be explained by way of example only, in the following way of an embodiment with reference to the drawing in which are shown.

DETAILED DESCRIPTION OF THE EMBODIMENTS

Figure 1:
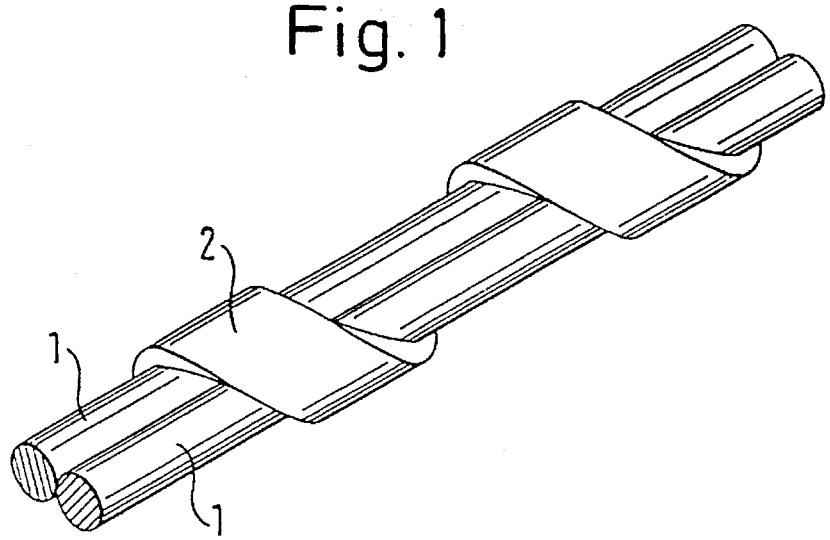
FIG. 1 a perspective illustration of a reinforcement cord formed in accordance with the invention, FIG. 2 a side view of a reinforcement cord formed in accordance with the invention, FIG. 3 a cross-section of a reinforcement cord in accordance with FIG. 2 taken on the section line III—III, and FIG. 4 a cross-section of a reinforcement cord in accordance with FIG. 2 taken on the section line IV—IV.

FIG. 1 shows a reinforcement cord which consists of inner filaments 1 which extend parallel to one another and a single outer filament 2 which surrounds the inner filaments 1 wound in a helical manner. The inner filaments 1 have a circular cross-section while the outer filament 2 has a flattened cross-section.

The outer filament 2 is so coiled around the inner filaments 1 that the broad side of the outer filament 2 is always in connection with the inner filaments 1. In this way, the inner connection surface areas between the outer and inner filaments is increased in comparison to customary reinforcement cords which are made of filaments of exclusively circular cross-section. Thus the wear which arises due to frictional contact between the individual filaments is reduced. At the same time the bending stiffness and compressive stiffness as well as the tensile strength are increased through the enlarged support surfaces between the inner filaments and the outer filaments.

Figure 2:
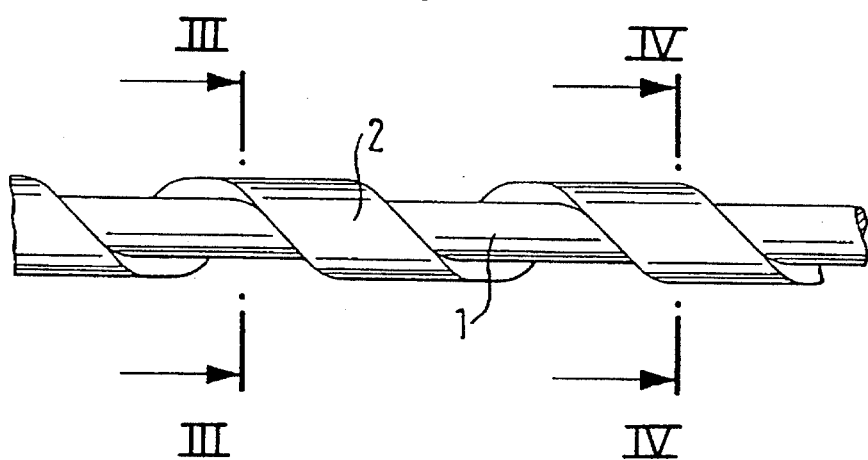

In FIG. 2 there is shown a side view of a second reinforcement cord formed in accordance with the invention. Here, the one inner filament is covered by the other so that in FIG. 2 only one of the inner filaments 1 can be seen.

Figure 3:
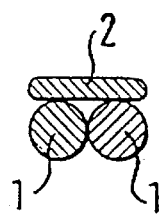

FIG. 3 shows a cross-section of the reinforcement cord of FIG. 2 in accordance with the section line III—III. One can see here the clearly lower height dimensions of the reinforcement cord in comparison to an embodiment in which the outer filament 2 would likewise have a circular cross-section.

Figure 4:
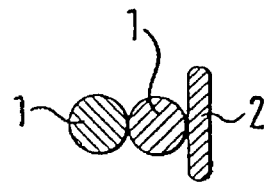

In FIG. 4 there is shown a cross-section of the reinforcement cord of FIG. 2 in accordance with the section line IV—IV. In this configuration, in which the three filaments come to lie alongside one another, the bending stiffness can be reduced in the horizontal direction and increased in the vertical direction through the use of the flattened outer filament 1. As the filaments of a reinforcement cord are arranged randomly distributed with respect to its axis, a more uniform bending stiffness of the total cord ply can be achieved in this way.

The invention being thus described, it will be obvious that the same maybe varied in many ways. Such variations are not to be regarded as a departure from the spirit and scope of the invention, and all such modifications as would be obvious to one skilled in the art are intended to be included within the scope of the following claims.

Having now described my invention, what I claim is:

1. A reinforcement cord for elastomeric products comprising a plurality of inner filaments and at least one outer filament wound helically around the inner filaments wherein at least the outer filament has a flattened cross-section and is so dimensioned and positioned that it substantially co-determines the mechanical characteristics of the reinforcement cord via line-like and/or area contact locations with the inner filaments, wherein the cross-sectional area of the at least one outer filament is in a range substantially from 50 to 100% of the total cross-sectional area of the inner filaments, and the lay of length of the at least one outer filament is between 20 to 40 times as large as the largest cross-sectional dimension of the at least one outer filament.

2. Reinforcement cord in accordance with claim 1, wherein the cross-sectional area of the outer filament is oval shape.

3. The reinforcement cord in accordance with claim 1, wherein the cross-sectional area of the at least one outer filament is of a flat oval shape having two flattened sides, at least one of the two flattened sides of the outer filament being formed as a planar surface.

4. The reinforcement cord in accordance with claim 1, wherein the cross-sectional area of the at least one outer filament is of a flat oval shape having two flattened sides, the two flattened sides of the at least one outer filament being formed as planar surfaces and extend parallel to one another.

5. The reinforcement cord in accordance with claim 1, wherein the cross-sectional area of the at least one outer filament is of a flat oval shape having two flattened sides, the width of the outer filament is between 0.25 and 0.70 millimeters and the height which is the distance between the flattened side of the outer filament is between 0.10 and 0.20 millimeters.

6. The reinforcement cord in accordance with claim 1 wherein the lay of length of the outer filament is in the range of 5 to 60 times the cross-sectional dimension or width of the inner filaments.

7. The reinforcement cord in accordance with claim 1 wherein the length of lay of the outer filament is between 9 and 19 millimeters.

8. The reinforcement cord in accordance with claim 1 wherein the reinforcement cord includes two inner filaments.

9. The reinforcement cord in accordance with claim 8, wherein the inner filaments are circular in cross section and have diameter of between 0.15 and 0.40 millimeters.

10. Reinforcement cord in accordance with claim 1 wherein the inner filaments have a flattened cross-section.

11. Reinforcement cord in accordance with claim 10, wherein the width of the inner filaments preferably is between 0.25 and 1.40 millimeters and the height of the inner filament preferably is between 0.10 and 0.40 millimeters.

12. The reinforcement cord in accordance with claim 1 wherein the inner filaments extend essentially parallel to one another.

13. Reinforcement cord in accordance with claim 1 wherein the inner filaments are twisted together.

14. Reinforcement cord in accordance with claim 13, wherein the length of lay of the inner filaments is larger than the length of lay of the outer filaments.

15. Reinforcement cord in accordance with claim 13 wherein the direction of twist of the inner filaments is opposed to the direction of winding of the outer filament.

16. Reinforcement cord in accordance with claim 1 wherein the direction of twist of the inner filaments corresponds to the winding direction of the outer filament.

17. Reinforcement cord in accordance with claim 1 wherein the inner filaments are wound around in helical-like manner by two outer filaments which do not cross one another.

18. Reinforcement cord in accordance with claim 1 wherein the reinforcement cord includes two inner filaments which have a flattened cross-section and which essentially lie against one another with their flattened sides in contact over their full length.

19. The reinforcement cord in accordance with claim 1 wherein the inner and the at least one outer filament are formed of steel.

20. Reinforcement cord in accordance with claim 1 wherein the inner and the outer filaments are of plastic, in particular of aramid, Kevlar, nylon or the like.

21. Reinforcement cord in accordance with claim 1 wherein the inner filaments are made of plastic, in particular of aramid, Kevlar, nylon or the like and the outer filaments are made of metal, in particular of steel.

22. Reinforcement cord in accordance with the claim 1 wherein the inner filaments are made of metal, in particular of steel, and the outer filaments are made of plastic, in particular of aramid, Kevlar, nylon or the like.

23. A reinforcement cord for elastomeric products comprising a plurality of inner filaments and only one outer filament wound helically around the inner filaments wherein the one outer filament has a flattened cross-section and is so dimensioned and positioned to substantially co-determine the mechanical characteristics of the reinforcement cord via line-like and/or area contact locations with the inner filaments, wherein the cross-sectional area of the one outer filament is in the range substantially from 50 to 100% of the total cross-sectional area of the inner filaments, and the lay of length of the one outer filament is between 20 to 40 times as large as the largest cross-sectional dimension of the one outer filament.

* * * * *